United States Patent
Inoue et al.

(10) Patent No.: US 8,573,288 B2
(45) Date of Patent: Nov. 5, 2013

(54) HEAT TRANSFER TUBE SUPPORT STRUCTURE

(75) Inventors: Tomoyuki Inoue, Hyogo (JP); Naoki Ogawa, Hyogo (JP); Hiroshi Hirano, Hyogo (JP); Masao Shiota, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 796 days.

(21) Appl. No.: 12/224,391

(22) PCT Filed: Mar. 20, 2007

(86) PCT No.: PCT/JP2007/055663
§ 371 (c)(1),
(2), (4) Date: Aug. 26, 2008

(87) PCT Pub. No.: WO2007/114048
PCT Pub. Date: Oct. 11, 2007

(65) Prior Publication Data
US 2009/0008070 A1    Jan. 8, 2009

(30) Foreign Application Priority Data
Mar. 31, 2006 (JP) ................. 2006-096948

(51) Int. Cl.
*F28F 9/00* (2006.01)
*F28F 9/04* (2006.01)

(52) U.S. Cl.
USPC .......................... 165/162; 165/178

(58) Field of Classification Search
CPC ..................................... F28F 9/0132
USPC ............ 165/157, 61, 162, 76, 178, DIG. 417, 165/DIG. 419, 161; 376/405
See application file for complete search history.

(56) References Cited

U.S. PATENT DOCUMENTS 1,992,504 A * 2/1935 Penniman .................. 165/81
4,213,499 A * 7/1980 Straffi ....................... 165/162
(Continued)

FOREIGN PATENT DOCUMENTS

JP    52-147967      5/1976
JP    1979-132852 U  9/1979
(Continued)

OTHER PUBLICATIONS

Chinese Office Action dated Dec. 11, 2009, issued in corresponding Chinese Patent Application No. 200780008858.0.

(Continued)

*Primary Examiner* — Tho V Duong
(74) *Attorney, Agent, or Firm* — Westerman, Hattori, Daniels & Adrian, LLP (57) ABSTRACT

An object is to provide a heat transfer tube support structure capable of preventing deterioration of the reliability and the durability of a heat transfer tube. In a steam generator (heat exchanger) having a lower barrel (vessel), heat transfer tubes disposed in the lower barrel, and tube support plates disposed in the lower barrel and having heat transfer tube insertion holes opened in a thickness direction, support portions for supporting the heat transfer tubes are formed to the intermediate portions of the inner surfaces of the heat transfer tube insertion holes in the axial direction of the heat transfer tube insertion holes, and the regions between the support portions and the respective open ends of the heat transfer tube insertion holes are formed of inclined surfaces inclining in a radial direction outwardly in the heat transfer tube insertion holes toward the open ends, respectively.

2 Claims, 7 Drawing Sheets

(56) References Cited

U.S. PATENT DOCUMENTS

| | | | | |
|---|---|---|---|---|
| 4,576,228 A | * | 3/1986 | Glatthorn | 165/162 |
| 4,709,756 A | | 12/1987 | Wilson et al. | |
| 4,834,173 A | * | 5/1989 | Weiss et al. | 165/159 |
| 5,447,191 A | * | 9/1995 | Boula | 165/69 |
| 5,699,395 A | * | 12/1997 | Sylvester et al. | 376/405 |
| 5,915,472 A | * | 6/1999 | Takikawa et al. | 165/158 |
| 6,302,064 B1 | * | 10/2001 | Billoue et al. | 122/491 |
| 6,498,827 B1 | * | 12/2002 | Klarner | 376/405 |
| 6,914,955 B2 | * | 7/2005 | Klarner | 376/405 |

FOREIGN PATENT DOCUMENTS

| | | |
|---|---|---|
| JP | 1984-153478 U | 10/1984 |
| JP | 62-041591 A | 2/1987 |
| JP | 62-142678 U | 9/1987 |
| JP | 1-117484 U | 8/1989 |
| JP | 6-63712 B2 | 8/1994 |
| JP | 9-280771 A | 10/1997 |
| TW | 430058 Y | 4/2001 |

OTHER PUBLICATIONS

International Search Report of PCT/JP2007/055663, date of mailing Jun. 19, 2007.

Taiwanese Office Action dated Sep. 7, 2009, issued in corresponding Taiwan Patent Application No. 96110880.

Japanese Office Action dated Mar. 29, 2011, issued in corresponding Japanese Patent Application No. 2006-096948.

* cited by examiner

HEAT TRANSFER TUBE SUPPORT STRUCTURE

TECHNICAL FIELD

The present invention relates to a heat transfer tube support structure in a heat exchanger of a steam generator and the like used in, for example, a nuclear power plant.

BACKGROUND ART

There is a heat exchanger including a vessel, a plurality of heat transfer tubes disposed in the vessel, and tube support plates for supporting the heat transfer tubes in the vessel. In the heat exchanger, heat is exchanged between a primary coolant water and a secondary coolant water in such a manner that the primary coolant water is caused to flow in the heat transfer tubes as well as the secondary coolant water is caused to flow in the vessel.

Here, a wrapper (peripheral edge support member) for supporting the peripheral edges of the tube support plates and stay rods (inner peripheral portion support members) for supporting the inner peripheral portions of the tube support plates are disposed in the vessel, and the tube support plates are fixed by these members in the vessel.

A support structure disclosed in, for example, Patent Document 1 described below is known as a support structure of the heat transfer tubes. In Patent Document 1, tube support plates having a plurality of tube holes are used as tube support plates, and heat transfer tubes are supported by the tube support plates through being inserted into the tube holes.

Here, the tube support plates secure a thickness larger than that necessary to support the heat transfer tubes so that they can withstand a load they receive from a secondary coolant water and the like flowing in a vessel as well as they secure a predetermined degree of area to the regions between the tube holes (in other words, the volume of the portions between the tube holes).

Each of the tube support plates has a plurality of projecting portions each projecting radially inwardly from the inner surface of the tube hole and having a contact surface for supporting the heat transfer tube in an inside end and forms a conical guide structure from the inner surface to the contact surface, and a taper portion is formed to at least one end of the projecting portion so that the heat transfer tube can be easily inserted into the tube hole. More specifically, in the tube support plate, the length of the projecting portion in the axial direction of the tube hole is shorter than the length of the tube hole even if it includes the length of the taper portion, and the inner surface of the tube hole located nearer to the open end side thereof than the projecting portion is formed to a shape parallel with the axial line (shape without taper).

[Patent Document 1] Japanese Examined Patent Application, Publication No. 6-63712 (claim 1 and FIG. 4)

DISCLOSURE OF INVENTION

In a steam generator, a wrapper and stay rods are heated by the heat generated by welding carried out in a manufacturing process, the heat generated by a post weld heat treatment (PWHT) carried out to secure soundness of a welded portion after the welding is carried out, and the heat of a secondary coolant water flowing in a vessel. At the time, when the amount of thermal expansion of a wrapper is different from that of stay rods, or when only any one of the wrapper and the stay rods is heated and thermally expanded, strain occurs to the tube support plates supported by the wrapper and the stay rods.

Further, when the attitude of the steam generator is changed in the manufacturing process, external force is applied to the steam generator due to the change of the attitude and further the direction in which the own weight of the steam generator is applied thereto changes, thereby strain also occurs in the tube support plates.

When strain occurs to a tube support plate, the inner surface of a tube hole inclines with respect to a heat transfer tube inserted into the tube hole and thus the open end and the like of the tube hole is pressed against the heat transfer tube. Accordingly, there is a possibility that dents and scratches occur to the heat transfer tube depending on a magnitude of strain occurred to the tube support plate.

As described above, since the large thickness is secured to the tube support plate, the tube hole has a long distance from one open end to the other open end thereof. Accordingly, even if the inner surface of the tube hole slightly inclines, the one open end of the tube hole is greatly dislocated from the other open end thereof, thereby a large amount of load is applied to the heat transfer tube. Occurrence of the dents and the scratches to the heat transfer tube as described above is not preferable because the reliability and the durability of the heat transfer tube are diminished.

An object of the present invention, which was made in view of the above problems, is to provide a heat transfer tube support structure in which dents and scratches are unlikely to occur to a heat transfer tube and which can prevent deterioration of the reliability and the durability of the heat transfer tube.

To solve the above subject, the present invention employs the following solutions.

That is, a first aspect of the present invention provides a heat transfer tube support structure used in a heat exchanger having a vessel, heat transfer tubes disposed in the vessel, and tube support plates disposed in the vessel and having heat transfer tube insertion holes opened in a thickness direction, wherein support portions for supporting the heat transfer tubes are formed to the intermediate portions of the inner surfaces of the heat transfer tube insertion holes in the axial direction of the heat transfer tube insertion holes, and the regions between the support portions and the respective open end sides of the heat transfer tube insertion holes are formed of inclined surfaces inclining in a radial direction outwardly in the heat transfer tube insertion holes toward the open ends, respectively.

In the heat transfer tube support structure arranged as described above, the heat transfer tube inserted into the heat transfer tube insertion hole of the tube support plate is supported by the support portion formed to the inner surface of the heat transfer tube insertion holes. On inner surface of the heat transfer tube insertion hole, the region between the support portion for supporting the heat transfer tube and the open end of the heat transfer tube insertion hole is formed of the inclined surface inclining in a radial direction outwardly in the heat transfer tube insertion hole toward the open end.

More specifically, in the heat transfer tube support structure, a gap (escaping space) is secured to the heat transfer tube in the inclined surface formed between the support portion and the open end.

Accordingly, even if the tube support plate inclines, the open end and the like of the heat transfer tube insertion hole are unlikely to be abutted against the heat transfer tube, thereby dents and scratches are unlikely to occur to the heat transfer tube.

Further, in the heat transfer tube support structure according to the present invention, even if a heat transfer tube comes into contact with the inner surface of a heat transfer tube insertion hole, the heat transfer tube is abutted against the inner surface (inclined surface) of the heat transfer tube insertion hole at an angle near to parallel. More specifically, in the heat transfer tube support structure according to the present invention, since the heat transfer tube is in contact with the inner surface of the heat transfer tube insertion hole in a large contact area, a load applied to the heat transfer tube is dispersed, thereby dents and scratches are unlikely to occur to the heat transfer tube.

Further, in the present invention, the inclined surfaces are formed from the open ends of the heat transfer tube insertion holes to the support portions thereof.

Accordingly, in the present invention, since the volume of the heat transfer tube insertion holes can be reduced while securing escaping spaces of the heat transfer tubes, the strength of the tube support plates can be secured.

A second aspect of the present invention provides a heat transfer tube support structure used in a heat exchanger having a vessel, heat transfer tubes disposed in the vessel, tube support plates disposed in the vessel and having heat transfer tube insertion holes opened in a thickness direction, a peripheral edge support member for supporting the peripheral edges of the tube support plates, and inner peripheral portion support members for supporting the inner peripheral portions of the tube support plates, wherein a relation of $D1/D2<0.6$ is established, wherein the distance from the support position of the tube support plate, which is located nearest to the peripheral edge to the center position of the tube support plate in the support positions of the tube support plate supported by the inner peripheral portion support members is shown by $D1$, and the distance from the support position of the tube support plate supported by the peripheral edge support member to the center position of the tube support plate is shown by $D2$.

The present invention has been achieved based on the following knowledge which the inventors have obtained through experiments.

In general, a vessel of a heat exchanger is constructed by welding a plurality of components, for example, by welding a cylindrical barrel portion to a dome-shaped channel head for closing both the ends of the barrel portion. Further, the vessel is subjected to a post weld heat treatment also in a manufacturing process of the vessel.

The peripheral edge support member for supporting the peripheral edges of the tube support plates is located nearer to the portions of the vessel to which the welding and the post weld heat treatment are applied than the inner peripheral portion support members for supporting the inner peripheral portions of the tube support plates. That is, the heat, which is applied to the vessel when the welding and the post weld heat treatment are carried out, is more liable to transmit to the peripheral edge support member than to the inner peripheral portion support members.

Accordingly, when the welding and the post weld heat treatment are applied to the vessel, the amount of heat expansion of the peripheral edge support member becomes larger than that of the inner peripheral portion support members. Thus, the peripheral edge of the tube support plate is pressed by the peripheral edge support member, thereby the portion of the tube support plate nearer to the peripheral edge thereof (hereinafter, referred to as "outside peripheral portion") than the support position thereof supported by the inner peripheral portion support member is warped toward one surface side of the tube support plate.

Further, when a temperature difference occurs between a fluid flowing in the vicinity of the peripheral edge support member and a fluid flowing in the vicinity of the inner peripheral portion support member while the heat exchanger is in operation, a difference of amounts of heat expansion occurs between the peripheral edge support member and the inner peripheral portion support member, thereby the tube support plate is deformed as described above.

Accordingly, the heat transfer tube insertion hole is inclined in the outside peripheral portion of the tube support plate. Thus, there is a possibility that the dents and the scratches to the heat transfer tube occur to the heat transfer tube supported by the outside peripheral portion of the tube support plate.

When the tube support plate is deformed due to heat expansion as described above, the support position at which the tube support plate is supported by the inner peripheral portion support member acts as a fulcrum point, and the support position at which the tube support plate is supported by the peripheral edge support member acts as a power point. Accordingly, the smaller the distance from the support position at which the tube support plate is supported by the inner peripheral portion support member to the support position at which it is supported by the peripheral edge support member is, the more the amount of deformation of the outside peripheral portion of the tube support plate (inclined angle of the outside peripheral portion to the inner peripheral portion) is increased. Further, the larger the distance from the support position at which the tube support plate is supported by the inner peripheral portion support member to the support position at which it is supported by the peripheral edge support member is, the more the amount of deformation of the outside peripheral portion is reduced.

Accordingly, in the present invention, when the distance from the support position of the tube support plate, which is located nearest to the peripheral edge to the center position of the tube support plate in the support positions of the tube support plate supported by the inner peripheral portion support members is shown by $D1$, and the distance from the support position of the tube support plate supported by the peripheral edge support member to the center position of the tube support plate is shown by $D2$, the relation of $D1/D2<0.6$ is established.

As described above, it is possible to reduce the amount of deformation of the outside peripheral portion of the tube support plate to the inner peripheral portion thereof by sufficiently securing the distance from the fulcrum point to the power point in the tube support plate as compared with the distance from the support position of the tube support plate supported by the peripheral edge support member to the center position thereof.

With this arrangement, even if the amount of heat expansion of the peripheral edge support member is different from that of the inner peripheral portion support member, the transfer tube insertion hole formed to the outside peripheral portion of the tube support plate inclines at a small angle, thereby dents and scratches are unlikely to occur to the outside peripheral portion of the tube support plate supported by the outside peripheral portion of the tube support plate.

Here, the following arrangement may be further employed in addition to that the distance between the fulcrum point and the power point of the tube support plate is secured.

Specifically, the support portions for supporting the heat transfer tubes may be formed to the intermediate portions of the inner surfaces of the heat transfer tube insertion holes in the axial direction of the heat transfer tube insertion holes, and the regions between the support portions and the respective open end sides of the heat transfer tube insertion holes may be formed of the inclined surfaces inclining in a radial direction outwardly in the heat transfer tube insertion holes toward the open ends, respectively.

In this case, since the gap (escaping space) is secured to the heat transfer tube in the inclined surface formed between the support portion and the open end, even if the tube support plate inclines, the open end and the like of the heat transfer tube insertion hole are unlikely to be abutted against the heat transfer tube, thereby dents and scratches are unlikely to occur to the heat transfer tube.

Further, even if the heat transfer tube comes into contact with the inner surface of the heat transfer tube insertion hole, the heat transfer tube is abutted against the inner surface (inclined surface) of the heat transfer tube insertion hole at an angle nearer to parallel. Since the heat transfer tube is in contact with the inner surface of the heat transfer tube insertion hole in a large contact area, a load applied to the heat transfer tube is dispersed. As a result, dents and scratches are unlikely to occur to the heat transfer tube.

Further, since the volume of the tube support plates can be more reduced than those disclosed in Patent Document 1 while securing the escaping spaces of the heat transfer tubes, the strength of the tube support plates can be secured.

Further, in the first aspect or the second aspect of the present invention, a chamfered portion may be formed to the boundary between the surface of the tube support plate and each inclined surface.

In this case, since no corner is formed to the boundary between the surface of the tube support plate and each inclined surface constituting the inner surface of the heat transfer tube insertion hole, even if the heat transfer tube comes into contact with the region, a load applied from the boundary to the heat transfer tube is dispersed, thereby dents and scratches are unlikely to occur to the heat transfer tube.

According to the heat transfer tube support structure of the present invention, deterioration of the reliability and the durability of the heat transfer tube can be prevented.

EXPLANATION OF REFERENCE SIGNS

1: steam generator (heat exchanger)
3: lower barrel (vessel)
13: heat transfer tube
15: wrapper (peripheral edge support member)
16: stay rod (inner peripheral portion support member)
25: tube support plate
26: heat transfer tube insertion hole
27: support portion
28: inclined surface
29: chamfered portion

BEST MODE FOR CARRYING OUT THE INVENTION

First Embodiment

A first embodiment of the present invention will be explained below with reference to the drawings.

Figure 1:
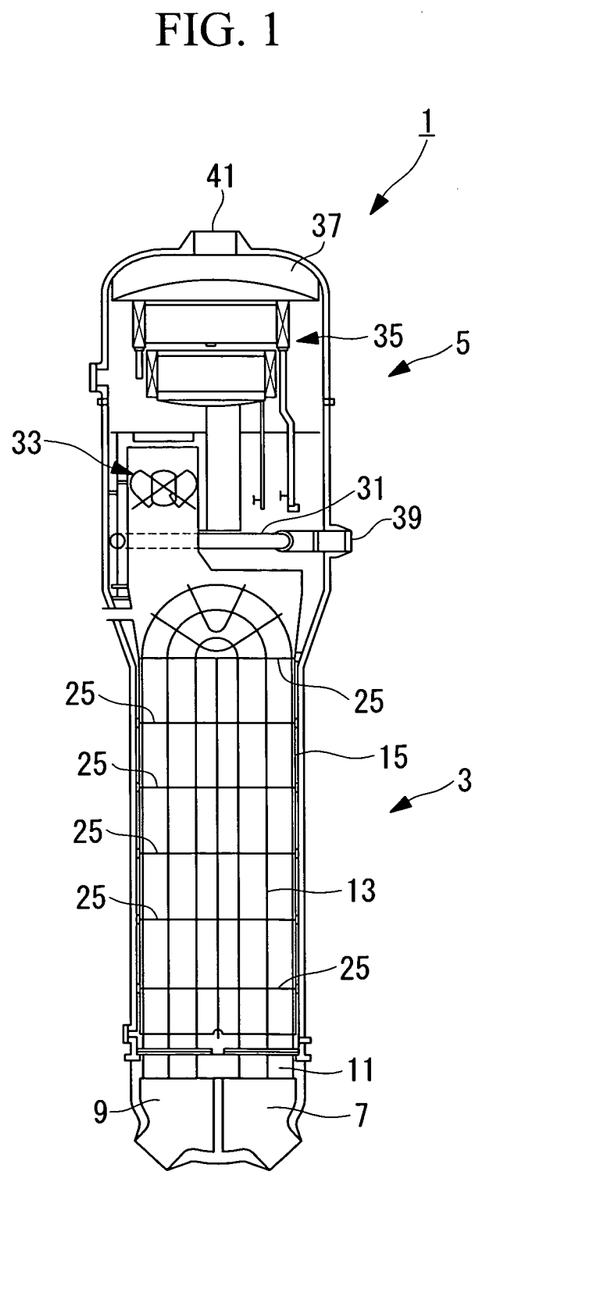
FIG. 1 is a longitudinal sectional view schematically showing an arrangement of a steam generator (heat exchanger) to which a heat transfer tube support structure according to a first embodiment of the present invention is applied.

The embodiment shows an example in which a heat transfer tube support structure according to the present invention is applied to a steam generator 1 shown in FIG. 1.

The steam generator 1 generates high pressure steam for driving a power generation turbine in a pressurized water reactor power station by carrying out heat exchange between high temperature/high pressure primary coolant water (primary coolant medium), which has collected the heat generated in a reactor core of an atomic reactor and secondary coolant water (secondary coolant medium) which flows in a flow path arranged independently of that of the primary coolant water to thereby boil the secondary coolant water.

A specific arrangement of the steam generator 1 will be explained below.

Figure 2:
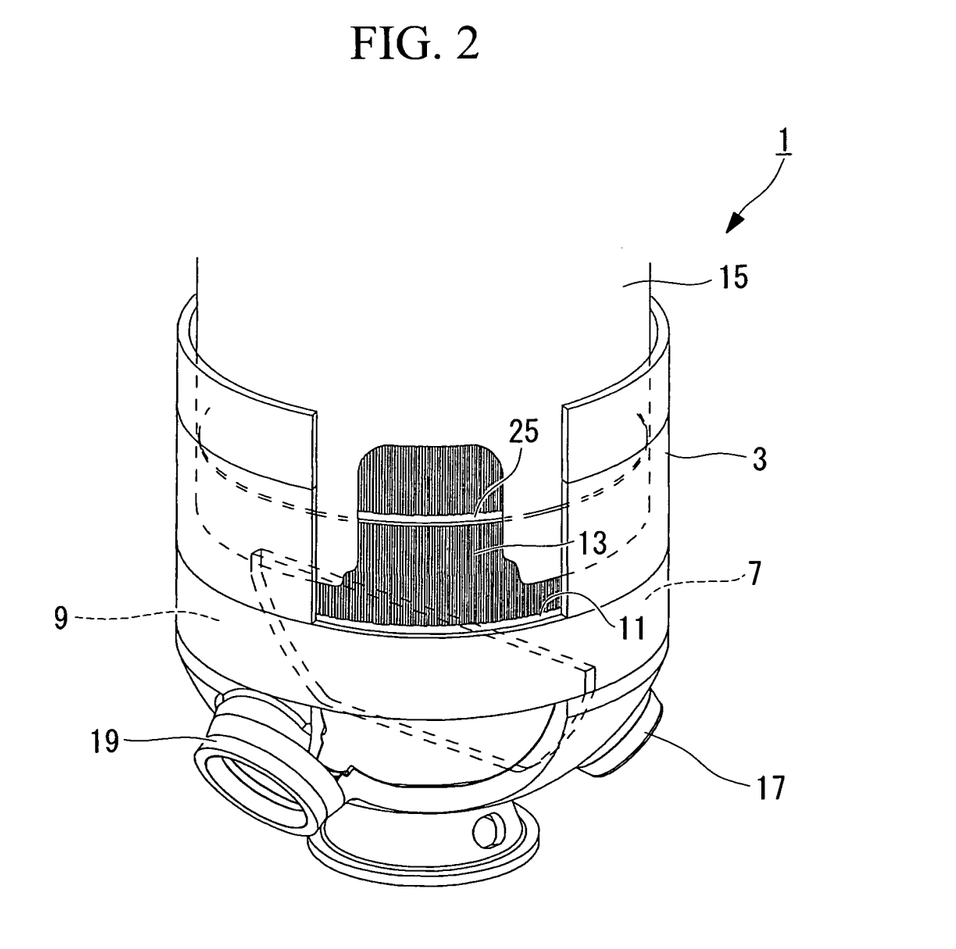
FIG. 2 is a perspective view partly in cross section showing the arrangement of the steam generator shown in FIG. 1.

As shown in FIGS. 1 and 2, the steam generator 1 has a vessel composed of an approximately cylindrical-shaped lower barrel 3 and an approximately cylindrical-shaped upper barrel portion 5.

The lower barrel 3 is provided with a first water chamber 7, a second water chamber 9, a tube plate 11, many heat transfer tubes 13, and a wrapper (external cylinder of tube group) 15.

The lower barrel 3 has a lower end formed to an approximately hemispherical dome shape, and the inside thereof is partitioned to two chambers, that is, to a right chamber and a left chamber. One of these two chambers is arranged as the first water chamber 7, and the other of them is arranged as the second water chamber 9. The first water chamber 7 is provided with a primary coolant medium inlet nozzle 17. Primary coolant water is introduced into the first water chamber 7 from the reactor core through the primary coolant medium inlet nozzle 17.

The second water chamber 9 includes a primary coolant medium outlet nozzle 19. The primary coolant water, which has been subjected to heat exchange in the steam generator 1 and collected into the second water chamber 9, is supplied to the reactor core of the atomic reactor through the primary coolant medium outlet nozzle 19.

As shown in FIG. 1, the tube plate 11 partitions the inside of the lower barrel 3 to a lower end portion for constituting the first and second water chambers 7 and 9, and an upper portion in which the heat transfer tubes 13 are accommodated.

The respective the heat transfer tubes 13 are disposed from the tube plate 11 up to the upper end of the lower barrel 3 and forms an inverse U-shaped flow path in the lower barrel 3. Each of the heat transfer tubes 13 has an end connected to the first water chamber 7 through the tube plate 11 and the other end connected to the second water chamber 9 through the tube plate 11.

The straight tube portions of the heat transfer tubes 13 are supported by a plurality of support plates 25 disposed vertically at predetermined intervals.

Figure 3:
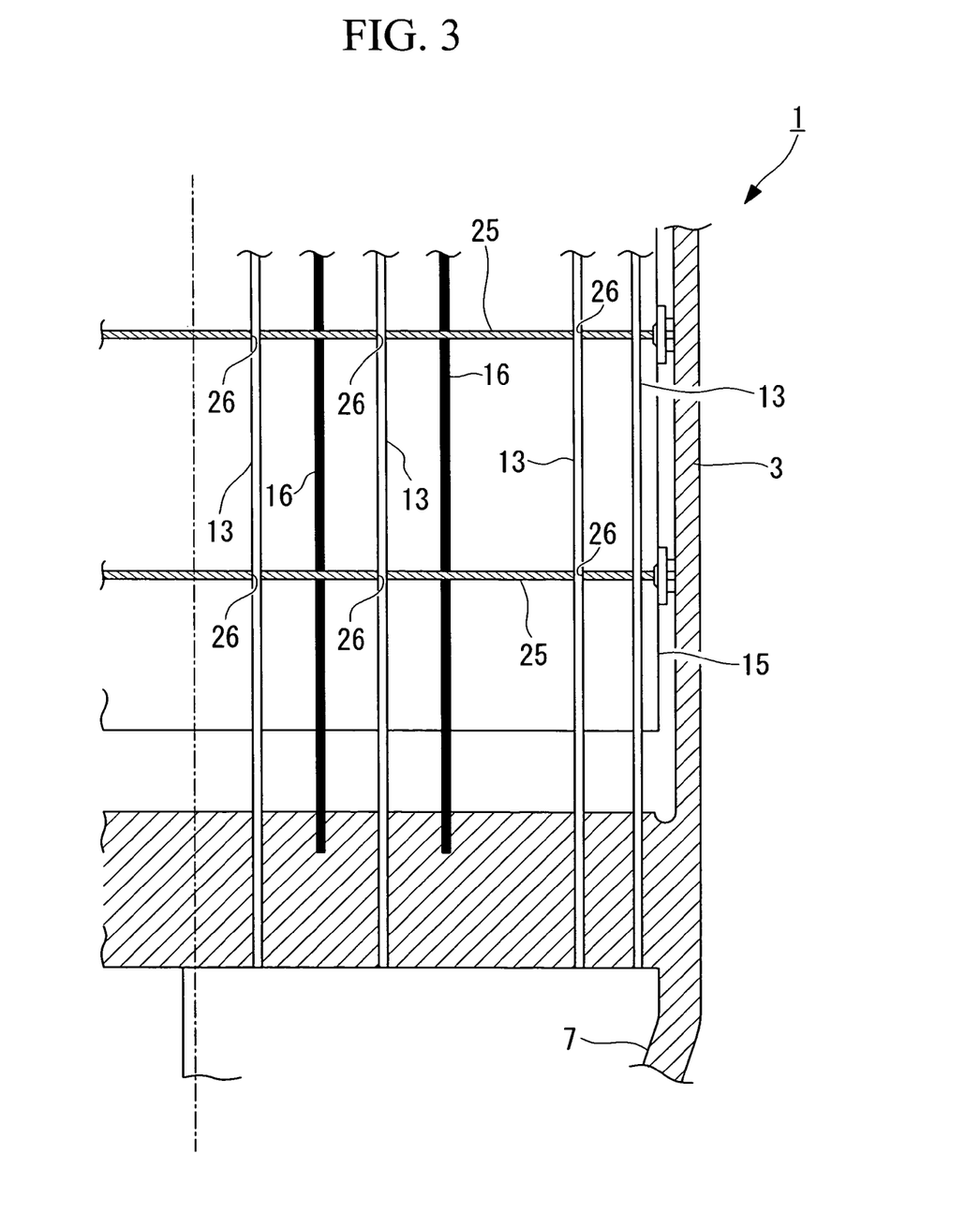
FIG. 3 is a partly enlarged view of FIG. 1.

Each of the tube support plates 25 is formed to an approximately circular shape and has a plurality of heat transfer tube insertion holes 26 opened in a thickness direction so that the heat transfer tubes 13 are inserted therethrough as shown in FIG. 3.

The inner regions of the tube support plates 25 in a radial direction are supported by a plurality of stay rods 16 disposed upward from the tube plate 11. In the embodiment, the plurality of stay rods 16 are disposed on a circle which is coaxial with the lower barrel 3, and a plurality of sets of stay rods 16 whose diameter is different in each set are disposed on the same circle. That is, the tube support plates 25 are supported by the stay rods 16 at a plurality of positions in the radial direction.

The wrapper 15 is an approximately cylindrical member for surrounding around the straight tube portions of all the heat transfer tubes 13, and the upper and lower ends thereof are fixed to the lower barrel 3 by welding and the like. The peripheral portions of the tube support plates 25 are fixed to the inner peripheral surface of the wrapper 15.

As shown in FIG. 1, the upper barrel portion 5 is provided with a water supply ring 31, a steam-water separator 33, a moisture separator 35, and a steam chamber 37.

The water supply ring 31 is a ring-shaped piping disposed to a lower portion of the upper barrel portion 5 and has a function for supplying the secondary coolant water supplied through a water inlet nozzle 39 disposed to the upper barrel portion 5 to the outside of the wrapper 15.

The steam-water separator 33 roughly separates steam mixed with water, which is supplied from the lower barrel 3, into steam and water. The water separated by the steam-water separator 33 is returned into the steam generator 1 again as secondary coolant water.

The steam roughly separated by the steam-water separator 33 is introduced into the moisture separator 35 for separating the humidity contained in the steam.

After the steam from which the humidity is separated is supplied into the steam chamber 37, it is supplied to the power generation turbine through a steam outlet nozzle 41 disposed to the upper barrel portion 5.

A support structure of the heat transfer tubes 13 in the steam generator 1 will be explained below in more detail.

Figure 4:
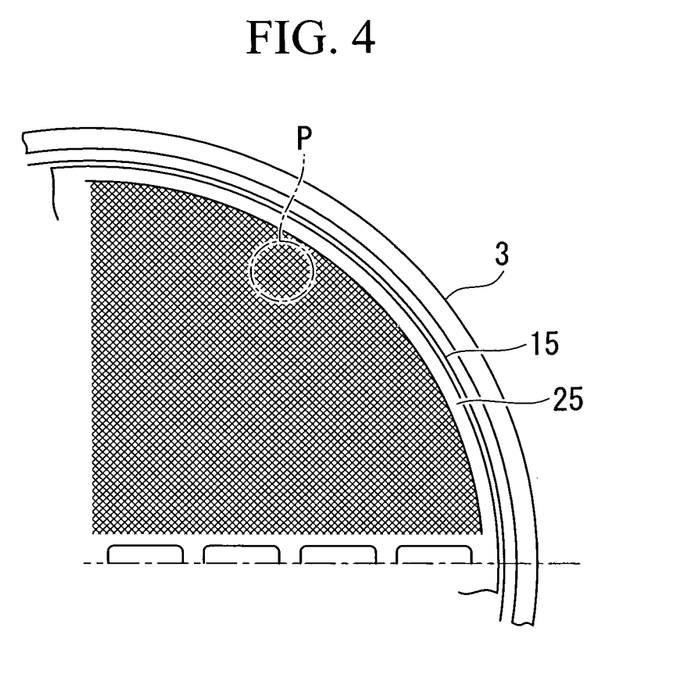
FIG. 4 is a closed sectional view of the steam generator to which the heat transfer tube support structure according to the first embodiment of the present invention is applied.

FIG. 4 shows a plan view of tube support plate 25. The tube support plate 25 has many heat transfer tube insertion holes 26 formed therethrough in a regular manner. In the tube support plate 25 of the embodiment, the heat transfer tube insertion holes 26 are formed in the respective intersecting portions of a plurality of slanting lines shown in FIG. 4.

Figure 5:
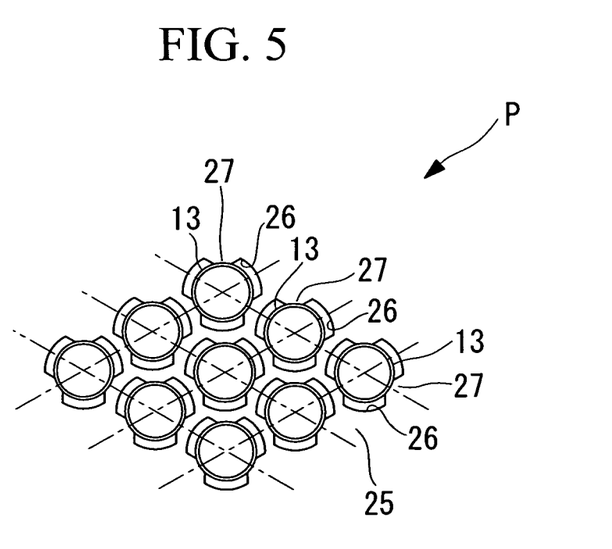
FIG. 5 is a partly enlarged view of FIG. 4.

A detailed layout of the heat transfer tube insertion holes 26 will be explained using FIG. 5. FIG. 5 is an enlarged view of a region P surrounded by a solid line in FIG. 4.

The heat transfer tube insertion holes 26 are formed on the tube support plate 25 at respective intersecting points obtained thereon, when two sets of a plurality of parallel lines are formed thereon at equal intervals and each set of a plurality of parallel lines is arranged by changing at an angle 60° to the other set.

Figure 6:
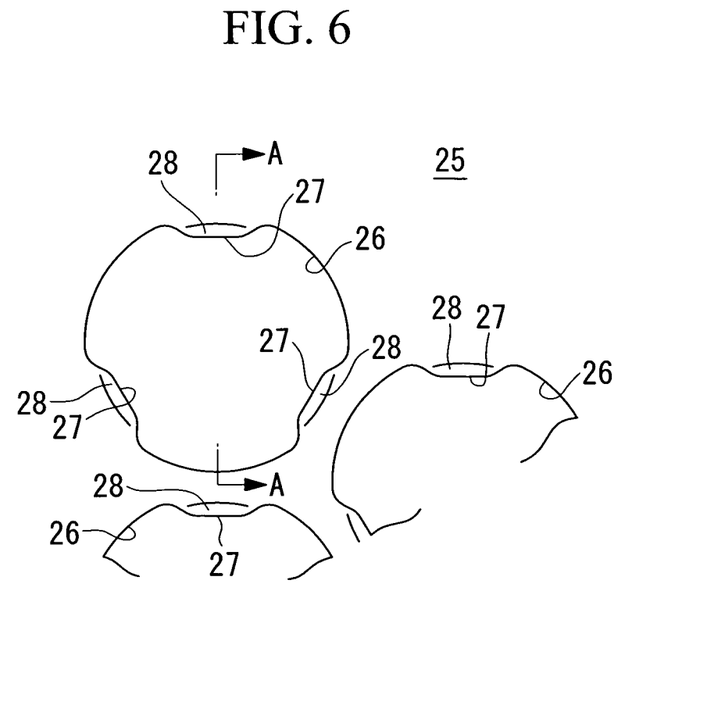
FIG. 6 is a plan view showing a shape of a tube support plate used in the heat transfer tube support structure according to the first embodiment of the present invention.

In the embodiment, as shown in FIGS. 5 and 6, the heat transfer tube insertion hole 26 is provided with support portions 27 formed to the approximately cylindrical inner surface thereof at a plurality of positions about the axial line of the insertion hole 26 to support the heat transfer tubes 13.

Figure 7:
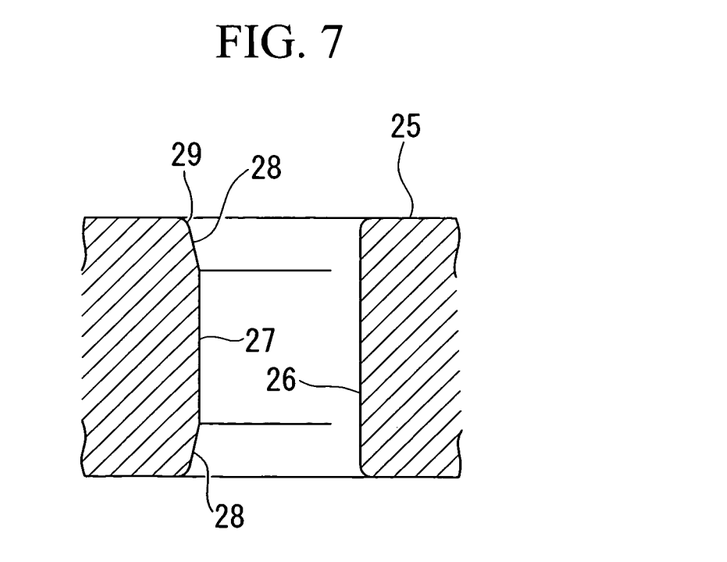
FIG. 7 is a fragmentary sectional view taken along the line A-A of FIG. 6.

As shown in FIG. 7, each of the support portions 27 is formed of a projecting portion projecting in a radial direction inwardly from an intermediate portion in the axial direction of the inner surface of the heat transfer tube insertion hole 26.

The projecting end of the support portion 27 is formed of a cylindrical surface which is approximately in parallel with the axial line of the heat transfer tube insertion hole 26 and supports the outside peripheral surface of the heat transfer tubes 13 through surface contact.

As shown in FIG. 6, in the embodiment, three pieces of the support portions 27 are formed about the axial line of the heat transfer tube insertion hole 26 at every 120°. With this arrangement, the cylindrical inner surface of the heat transfer tube insertion hole 26 is located across the axial line of the heat transfer tube insertion hole 26 with respect to the respective support portions 27.

On the inner surface of the heat transfer tube insertion hole 26, the region between the support portion 27 and each open end of the heat transfer tube insertion hole 26 is formed to an inclined surface 28 which inclines in a radial direction outwardly of the heat transfer tube insertion hole 26 toward the open end.

For example, in the embodiment, the heat transfer tube insertion hole 26 has a length of 35 mm, and the length of the inclined surface 28 is set to 7 mm in the axial direction of the heat transfer tube insertion hole 26. Further, the inclined angle θ of the inclined surface 28 with respect to the axial line O of the heat transfer tube insertion hole 26 is set to about 10° (refer to FIG. 8).

Figure 8:
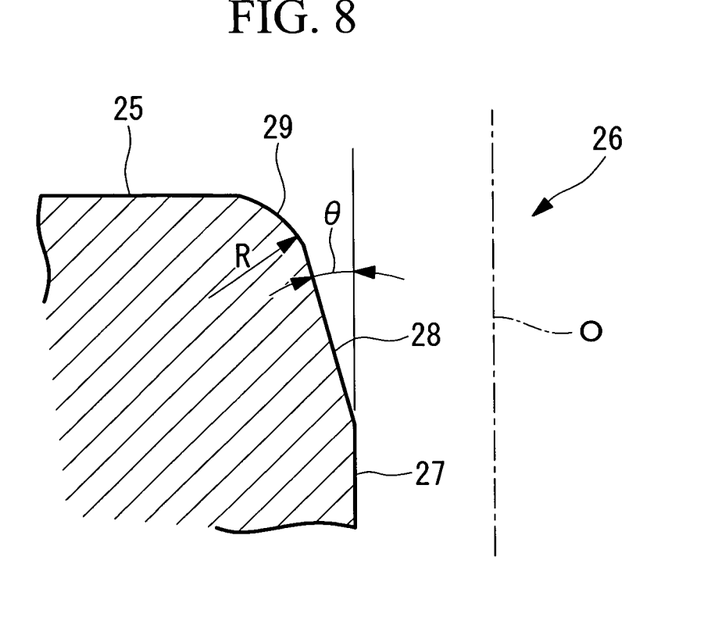
FIG. 8 is a partly enlarged view of FIG. 7.
Figure 9:
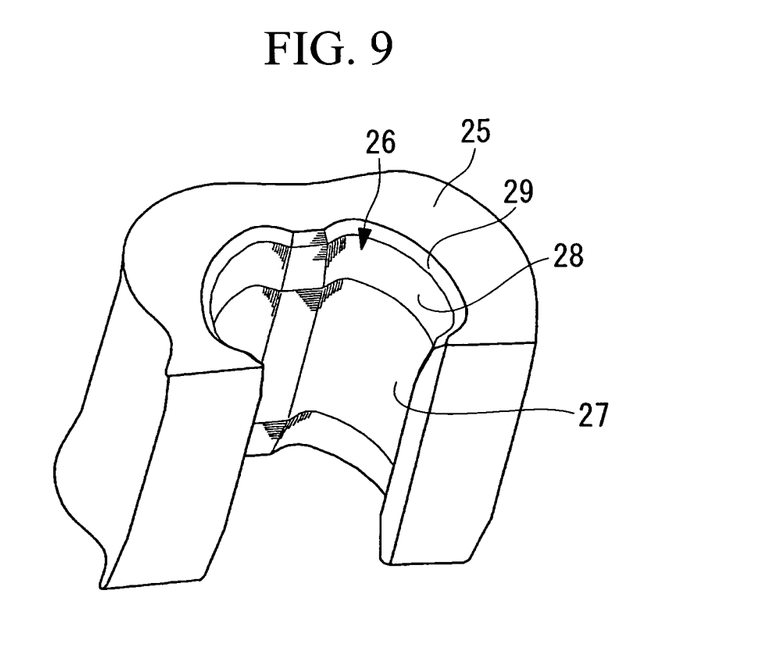
FIG. 9 is a perspective view partly in cross section showing a shape of the tube support plate used in the heat transfer tube support structure according to the first embodiment of the present invention.

Further, as shown in FIGS. 8 and 9, a chamfered portion 29 is formed to the boundary between the surface of the tube support plate 25 and each inclined surface 28. It is preferable that the chamfered portion 29 is formed of a curved surface having a radius of curvature R of, for example, 1.0 mm or more (for example, R=2 mm or R=3 mm).

In the support structure of the heat transfer tubes 13, the heat transfer tubes 13 inserted into the heat transfer tube insertion holes 26 of the tube support plate 25 are supported by the support portions 27 disposed to the inner surfaces of the heat transfer tube insertion holes 25.

On the inner surface of the heat transfer tube insertion hole 26, the region between the support portions 27 for supporting the heat transfer tube 13 and the open end of the heat transfer tube insertion hole 26 is formed of the inclined surface 28 which inclines in a radial direction outwardly of the heat transfer tube insertion hole 26 toward the open end side.

More specifically, in the support structure of the heat transfer tube 13, a gap (escaping space) is secured to the heat transfer tube 13 in the portion of the inclined surface 28 formed between the support portion 27 and the open end.

Figure 10:
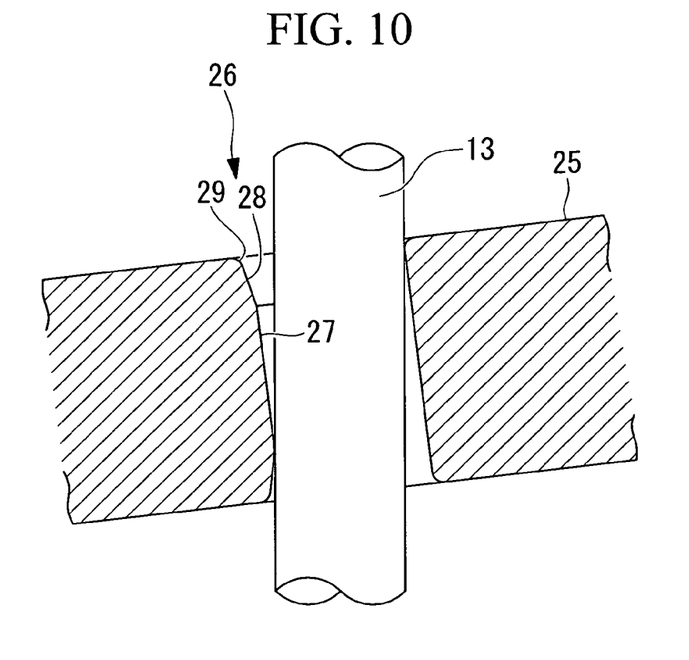
FIG. 10 is a view schematically showing an operation of the heat transfer tube support structure according to the first embodiment of the present invention.

Accordingly, even if the tube support plate 25 inclines as shown in FIG. 10, the open end and the like of the heat transfer tube insertion hole 26 is unlikely to be abutted against the heat transfer tube 13, and thus dents and scratches are unlikely to occur to the heat transfer tube 13.

In the tube support plate disclosed in Patent Document 1, the inner surface of the tube hole located nearer to the open end side thereof than the projecting portion is formed to the shape parallel with the axial line (shape without taper) as described above. Accordingly, in the tube support plate disclosed in Patent Document 1, when the tube support plate inclines with respect to a heat transfer tube, the heat transfer tube comes into contact with a corner portion in which the open end of the tube hole intersects with the front surface of the tube support plate. Since the corner portion is formed to an approximately right angle, force is intensively applied to the portion where the heat transfer tube is abutted against the corner portion, thereby dents and scratches are liable to occur to the heat transfer tube.

In contrast, in the heat transfer tube support structure according to the embodiment, even if the tube support plate 25 inclines as described above, the open end and the like of the heat transfer tube insertion hole 26 is unlikely to be abutted against the heat transfer tube 13. Further, even if the heat transfer tube 13 comes into contact with the inner surface of the heat transfer tube insertion hole 26, the heat transfer tube 13 is abutted against the inner surface (inclined surface 28) of the heat transfer tube insertion hole 26 at an angle nearer to parallel. More specifically, in the heat transfer tube support structure according to the embodiment, since the heat transfer tube 13 is in contact with the inner surface of the heat transfer tube insertion hole 26 in a large contact area, a load applied to the heat transfer tube 13 is dispersed. As a result, dents and scratches are unlikely to occur to the heat transfer tube.

Further, in the tube support plate disclosed in Patent Document 1, the taper portion of the tube hole projecting portion does not reach up to the open end of the tube hole, whereas in the heat transfer tube support structure according to the embodiment, the inclined surface 28 is formed from the open end of the heat transfer tube insertion hole 26 of the tube support plate 25 to the support portion 27.

Accordingly, in the present invention, the volume of the heat transfer tube insertion hole 26 can be made smaller than that of the tube hole of the tube support plate disclosed in Patent Document 1 (in other words, the volume of the region between the heat transfer tube insertion holes 26 of the tube support plate 25 can be more increased than that between the tube holes of the tube support plate disclosed in Patent Document 1 while securing the escaping space of the heat transfer tubes 13, thereby strength of the tube support plate 25 can be secured.

Further, in the embodiment, the chamfered portion 29 is formed to the boundary between the surface of the tube support plate 25 and each inclined surface 28.

With this arrangement, since no corner is formed to the boundary between the surface of the tube support plate 25 and each inclined surface 28 constituting the inner surface of the heat transfer tube insertion hole 26, even if the heat transfer tube 13 comes into contact with the region, a load applied from the boundary to the heat transfer tube 13 is dispersed, thereby dents and scratches are unlikely to occur to the heat transfer tube 13.

As described above, according to the support structure of the heat transfer tube of the embodiment, since dents and scratches are unlikely to occur to the heat transfer tube 13, it is possible to prevent deterioration of the reliability and the durability of the heat transfer tube 13.

Second Embodiment

A second embodiment of the present invention will be explained below using FIG. 11.

A heat transfer tube support structure according to the second embodiment is arranged in the steam generator 1 shown in the first embodiment such that when the distance from the support position of the tube support plate 25, which is located nearest to the peripheral edge of the tube support plate 25 in the support positions of the tube support plate 25 supported by the stay rods 16 (inner peripheral portion support members), to the center position of the tube support plate 25 is shown by D1, and the distance from the support position of the tube support plate 25 supported by the wrapper 15 (peripheral edge support member) to the center position of the tube support plate 25 is shown by D2, a relation of D1/D2<0.6 is established.

The lower barrel 3 of the steam generator 1 is formed by welding a cylindrical barrel portion to a dome-shaped channel head for closing the lower end of the barrel portion. Further, in a manufacturing process of the lower barrel 3, a post weld heat treatment is carried out to secure soundness of a welded portion.

As shown in FIG. 3, the wrapper 15 for supporting the peripheral edges of the tube support plates 25 is located nearer to the portions of the lower barrel 3 to which the welding and the heat treatment are applied than the stay rods 16 for supporting the inner peripheral portions of the tube support plates 25. That is, the heat, which is applied to the lower barrel 3 when the welding and the post weld heat treatment are carried out, is more liable to transmit to the wrapper 15 than to the stay rod 16.

Accordingly, when the welding and the post weld heat treatment are applied to the lower barrel 3, the amount of heat expansion of the wrapper 15 becomes larger than that of the stay rods 16. Thus, the peripheral edge of the tube support plate 25 is pressed upward by the wrapper 15, thereby the portion of the tube support plate 25 nearer to the peripheral edge thereof (outside peripheral portion) than the support position thereof supported by the stay rod 16 is warped toward the upper surface side of the tube support plate 25.

Further, when a temperature difference occurs between a fluid flowing in the vicinity of the wrapper 15 and a fluid flowing in the vicinity of the stay rod 16 while the heat exchanger 1 is in operation, a difference of amounts of heat expansion occurs between the wrapper 15 and the stay rod 16, thereby the tube support plate 25 is deformed as described above.

Accordingly, the heat transfer tube insertion hole 26 is inclined in the outside peripheral portion of the tube support plate 25.

When the tube support plate 25 is deformed to heat expansion as described above, the support position at which the tube support plate 25 is supported by the stay rod 16 acts as a fulcrum point, and the support position at which the tube support plate 25 is supported by the wrapper 15 acts as a power point. Accordingly, the smaller the distance from the support position at which the tube support plate 25 is supported by the stay rod 16 to the support position at which it is supported by the wrapper 15 is, the more the amount of deformation of the outer peripheral portion of the tube support plate 25 (inclined angle of the outer peripheral portion to the inner peripheral portion, shown by a single-dashed line in FIG. 11) is increased. Further, the larger the distance from the support position at which the tube support plate 25 is supported by the stay rod 16 to the support position at which it is supported by the wrapper 15 is, the more the amount of deformation of the outer peripheral portion is reduced.

Accordingly, in the second embodiment, when the distance from the support position of the tube support plate 25, which is located nearest to the peripheral edge (support position supported by the set of the stay rods 16 disposed to the outermost peripheral portion) to the center position of the tube support plate 25 in the support positions of the tube support plate 25 supported by the stay rods 16 is shown by D1, and the distance from the support position of the tube support plate 25 supported by the wrapper 15 to the center position of the tube support plate 25 is shown by D2, the relation of D1/D2<0.6 is established.

As described above, it is possible to reduce the amount of deformation of the outside peripheral portion of the tube support plate 25 with respect to the inner peripheral portion thereof by sufficiently securing the distance from the fulcrum to the power point in the tube support plate 25 as compared with the distance D2 from the support position of the tube support plate 25 supported by the wrapper 15 to the center position thereof.

Figure 11:
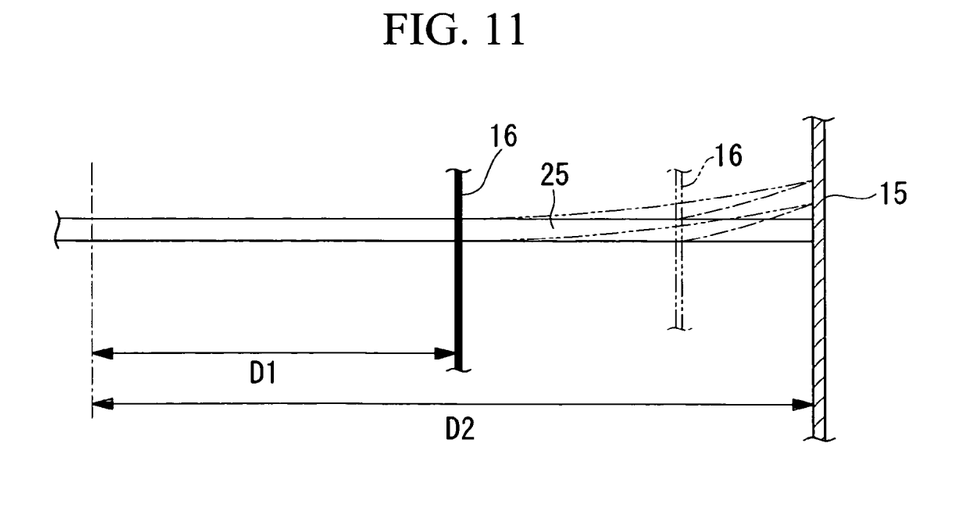
FIG. 11 is a view schematically showing a heat transfer tube support structure according to a second embodiment of the present invention.

With this arrangement, even if the amount of heat expansion of the wrapper 15 is different from that of the stay rod 16, the transfer tube insertion hole 26 formed to the outside peripheral portion of the tube support plate 25 inclines at a small angle as shown by double-dashed lines of FIG. 11, thereby dents and scratches are unlikely to occur to the heat transfer tube 13 supported by the outside peripheral portion of the tube support plate 25.

The second embodiment shows the example in which the inner surface of the heat transfer tube insertion hole 26 of the tube support plate 25 is formed to the same shape as that of the heat transfer tube insertion hole 26 of the tube support plate 25 shown in the first embodiment. However, when the relation between the support position of the tube support plate 25 supported by the stay rod 16 and the support position of the tube support plate 25 supported by the wrapper 15 is set to a preferable range as described above, it is not always necessary to provide the inclined surface 28 and the chamfered portion 29 in the tube support plate 25 because the inclination of the tube support plate 25 itself can be suppressed.

The invention claimed is:

1. A heat transfer tube support structure used in a heat exchanger, comprising:
   a vessel, heat transfer tubes disposed in the vessel, tube support plates disposed in the vessel and having heat transfer tube insertion holes opened in a thickness direction, a peripheral edge support member, and inner peripheral portion support members,
   said tube support plate consisting of peripheral edges and inner peripheral portions;
   said peripheral edge support member, which is a cylindrical shape wrapper that surrounds straight tube portions of the heat transfer tubes, supports the peripheral edges of the tube support plates; and
   said inner peripheral portion support members are disposed in a circle so as to support the inner peripheral portions of the tube support plates at a plurality of positions in a radial direction,
   wherein a relation of D1/D2<0.6 is established,
   wherein a radial distance from a support position of the tube support plate supported by the inner peripheral portion support member located nearest to the peripheral edge of the tube support plate to a center position of the tube support plate is D1, and a radial distance from a support position of the tube support plate supported by the peripheral edge support member to the center position of the tube support plate is D2,
   wherein support portions for supporting the heat transfer tubes are formed at a plurality of positions in an intermediate portion of an inner surface of each of the heat transfer tube insertion holes in an axial direction of each of the heat transfer tube insertion holes, said support portions formed at the plurality of positions in the intermediate portion of the inner surface of each of the heat transfer tube insertion holes support one of the heat transfer tube; and
   the regions between each of the support portions formed at each of the plurality of positions and respective open ends of each of the heat transfer tube insertion holes are formed of an inclined surface inclining in a radial direction outwardly toward the respective open ends of each of the heat transfer tube insertion holes.

2. A heat transfer tube support structure according to claim 1, wherein chamfered portions are formed to the boundaries between the surfaces of the tube support plates and the respective inclined surfaces.

* * * * *